United States Patent [19]
Hayakawa et al.

[11] Patent Number: 5,237,589
[45] Date of Patent: Aug. 17, 1993

[54] METHOD OF AND APPARATUS FOR SHAPING WAVEFORM AND METHOD OF AND APPARATUS FOR GENERATING THRESHOLD FOR WAVEFORM SHAPING

[75] Inventors: Tomohiko Hayakawa, Nagaokakyo; Seigo Inamine, Takatsuki, both of Japan

[73] Assignee: Omron Corporation, Kyoto, Japan

[21] Appl. No.: 715,241

[22] Filed: Jun. 14, 1991

[51] Int. Cl.$^5$ .................. H04L 25/34; H04L 25/49
[52] U.S. Cl. ........................... 375/17; 375/22; 375/76; 375/95; 307/234; 307/358
[58] Field of Search .................. 375/76, 94, 17, 22, 375/95; 307/234, 354, 358, 359; 371/6, 57.2, 64

[56] References Cited
U.S. PATENT DOCUMENTS

| | | | |
|---|---|---|---|
| 4,242,755 | 12/1980 | Gauzan | 375/94 |
| 4,318,128 | 3/1982 | Sauvanet | 375/76 |
| 4,481,628 | 11/1984 | Pasquinelli | 371/64 |
| 4,783,658 | 11/1988 | Nakano et al. | 375/76 |
| 5,025,176 | 6/1991 | Takeno | 307/359 |
| 5,052,021 | 9/1991 | Goto et al. | 375/76 |

*Primary Examiner*—Curtis Kuntz
*Assistant Examiner*—Don Vo
*Attorney, Agent, or Firm*—Dickstein, Shapiro & Morin

[57] ABSTRACT

A waveform shaping method including a step of detecting at least two items selected from three items i.e. a signal time width, a peak value level, and a signal failure time width of an input signal in a unit time length, a step of converting for each of the detected items a detected value into a function value based on a function representing likelihood of a logical value "1" or "0", a step of conducting a predetermined computation on the converted function values related to the at least two items to attain a result, and a step of discriminating the result of the computation by a predetermined threshold value to determine a logical value "1" or "0" for the input signal in the unit time length.

8 Claims, 12 Drawing Sheets

| $D_W$ | $V_N$ | THRESHOLD $\frac{ThH}{ThL}$ |
|---|---|---|
| S | S | S |
| S | L | M |
| L | S | L |
| L | L | VL |

METHOD OF AND APPARATUS FOR SHAPING WAVEFORM AND METHOD OF AND APPARATUS FOR GENERATING THRESHOLD FOR WAVEFORM SHAPING

BACKGROUND OF THE INVENTION

1. Field of the Invention

The present invention relates to a method of and an apparatus for shaping a waveform of an input signal and to a method of and an apparatus for generating a threshold for a waveform shaping.

2. Description of Related Art

In a case where a logical processing is achieved on an input signal, when a decoding of the input signal is conducted to attain a logical value (1 or 0) represented by the input signal, it is a common practice that the input signal is processed through a level discrimination based on a predetermined threshold value to be converted into a logical signal expressing a logical value 1 or 0 depending on the discrimination level thereof. However, when the input signal contains a relatively large component of noise, there may be developed a wrong logical value. In order to remove noises, a high-pass filter (HPF) and/or a low-pass filter (LPF) have/-has been employed in the prior art; however, necessary signal components other than the noises may be disadvantageously removed by the filter(s) in some cases.

The noise reduction has been an essential problem, particularly, in the fields of data communications. For example, in order to improve the signal-to-noise (S/N) ratio of a signal transmitted through a modulation system such as an amplitude shift keyinq (ASK), a frequency shift keying (FSK), or a phase shift keying system, there have been utilized an analog filtering, a digital filtering, etc. However, noises contained in signals supplied via a transmission route of a considerably low quality cannot be easily removed therefrom, which inevitably increases the size of a circuit or a software system for the noise filtering operation.

SUMMARY OF THE INVENTION

It is therefore an object of the present invention to provide a waveform shaping method and a waveform shaping apparatus capable of comprehensively judging an overall waveform of an input signal to obtain a signal representing a logical value "1" or "0".

Another object of the present invention is to provide a method of and an apparatus for generating a threshold for a waveform shaping of an input signal capable of changing the threshold depending on a state of a noise contained in the input signal.

The waveform shaping method according to the present invention is characterized in that among three items including a signal time width of an input signal, a peak value level of the input signal, and a signal failure time width of the input signal within a unit period of time, at least two items are sensed such that the sensed value of each item is converted to a function value according to a function representing likelihood of a logical value "1" or "0". The obtained function values respectively associated with the sensed items above are subjected to a predetermined computation. Thereafter, the computed results are discriminated by a preset threshold value so as to determine a logical value "1" or "0" of the input signal in the unit period of time.

The waveform shaping apparatus according to the present invention is characterized by comprising sense means for sensing at least two items selected from three items including a signal time width of an input signal, a peak value level of the input signal, and a signal failure time width of the input signal within a unit period of time, convert means for converting the sensed value of each sensed item to a function value according to a function representing likelihood of a logical value "1" or "0", and means for achieving a predetermined computation on the obtained function values respectively associated with the at least two items above and for discriminating thereafter the computed results by a preset threshold value, thereby determining a logical value "1" or "0" of the input signal in the unit period of time.

In accordance with the present invention, attributes of a waveform of an input signal, for example, a signal time width, a peak value level, and a signal failure time width are evaluated depending on functions each representing liklihood of a logical value "1" or "0". The evaluated results are subjected to computations so as to discriminate the computed results by a predetermined threshold value, thereby attaining a logical value "1" or "0". That is, plural information items attained from the waveforms of the input signal are comprehensively judged to achieve a shaping operation Of the waveform, thereby reproducing a relatively appropriate waveform with reduced influences from the noises and the like. In addition, the processing of the present invention may be conducted by use of a software system. In this case, the software is relatively simple and hence can be provided at a relatively low price. Moreover, when the present invention is applied to communications e.g. to achieve a shaping of a waveform of a received signal, redundant bits such as parity bits for an error detection need not be necessarily used. Accordingly, the communication speed is advantageously increased.

The threshold generating method for a waveform shaping of the present invention is characterized in that a value representing an amplitude of a white noise of an input signal and a peak value of a pulsated noise are detected. Using the detected values as inputs, there is determined a threshold value for the waveform shaping of the input signal based on membership functions respectively related to the value representing the amplitude of the white noise, the peak value of the pulsated noise and the threshold value and predetermined rules.

In accordance with the present invention, the apparatus for generating a threshold value for a waveform shaping is characterized by comprising means for detecting a value representing an amplitude of a white noise contained in an input signal, means for detecting a peak value of a pulsated noise thereof, and means for determining based on the detected values as inputs thereto a threshold value for the waveform shaping of the input signal depending on membership functions respectively related to the value representing the amplitude of the white noise, the peak value of the pulsated noise and the threshold value, and predetermined rules.

According to the present invention, the threshold value employed to achieve a level discrimination in the waveform shaping is altered in association with a state of the noise. That is, when the input signal contains a noise component having a large magnitude or the noise component occupies a great portion of the input signal, the threshold value is set to a large value. Conversely, for a smaller noise component, the threshold value is reduced. The provisions above prevent occurrences of errors in the level discrimination to the maximum extent so as to achieve a relatively appropriate waveform shaping.

In addition, the waveform shaping method according to the present invention is characterized in that for an input signal, first threshold values associated with plural different levels are established to discriminate the input signal for a predetermined period of time based thereon. Moreover, for each of portions of the input signal exceeding the respective threshold values, a time width thereof is obtained to achieve a predetermined computation for the plural time widths thus obtained. The computation result is thereafter discriminated depending on a second threshold to determine a logical value "1" or "0" of the input signal processed in the predetermined period of time.

The waveform shaping apparatus in accordance with the present invention is characterized by comprising compare means to be assigned with first threshold values having plural different levels so as to discriminate the input signal for a predetermined period of time depending on the first threshold values, thereby obtaining a time width of each of the portions of the input signal exceeding the respective threshold values, compute means for conducting a predetermined computation on the plural time widths thus obtained, and means for discriminating the computation result based on a second threshold to determine a logical value "1" or "0" of the input signal developed in the predetermined period of time.

According to the present invention, an input signal is subjected to a level discrimination based on a plurality of first threshold values to achieve a predetermined computation on the discrimination results such that the attained computation result are further discriminated by a second threshold value, thereby finally attaining a logical value "1" or "0" of the input signal. In consequence, according to the present invention, as compared with a case where the level discrimination of the input signal is carried out only with one threshold value, disadvantageous influence, for example, by noises can be removed, which enables a relatively correct waveform shaping to be achieved on the input signal.

BRIEF DESCRIPTION OF THE DRAWINGS

The objects and features of the present invention will become more apparent from the consideration of the following detailed description taken in conjunction with the accompanying drawings wherein:

FIGS. 16 and 17 are diagrams collectively showing another embodiment of a waveform shaping circuit according to the present invention in which

DESCRIPTION OF THE PREFERRED EMBODIMENTS

Referring now to the accompanying drawings, a description will now be given of embodiments according to the present invention.

Figure 1:
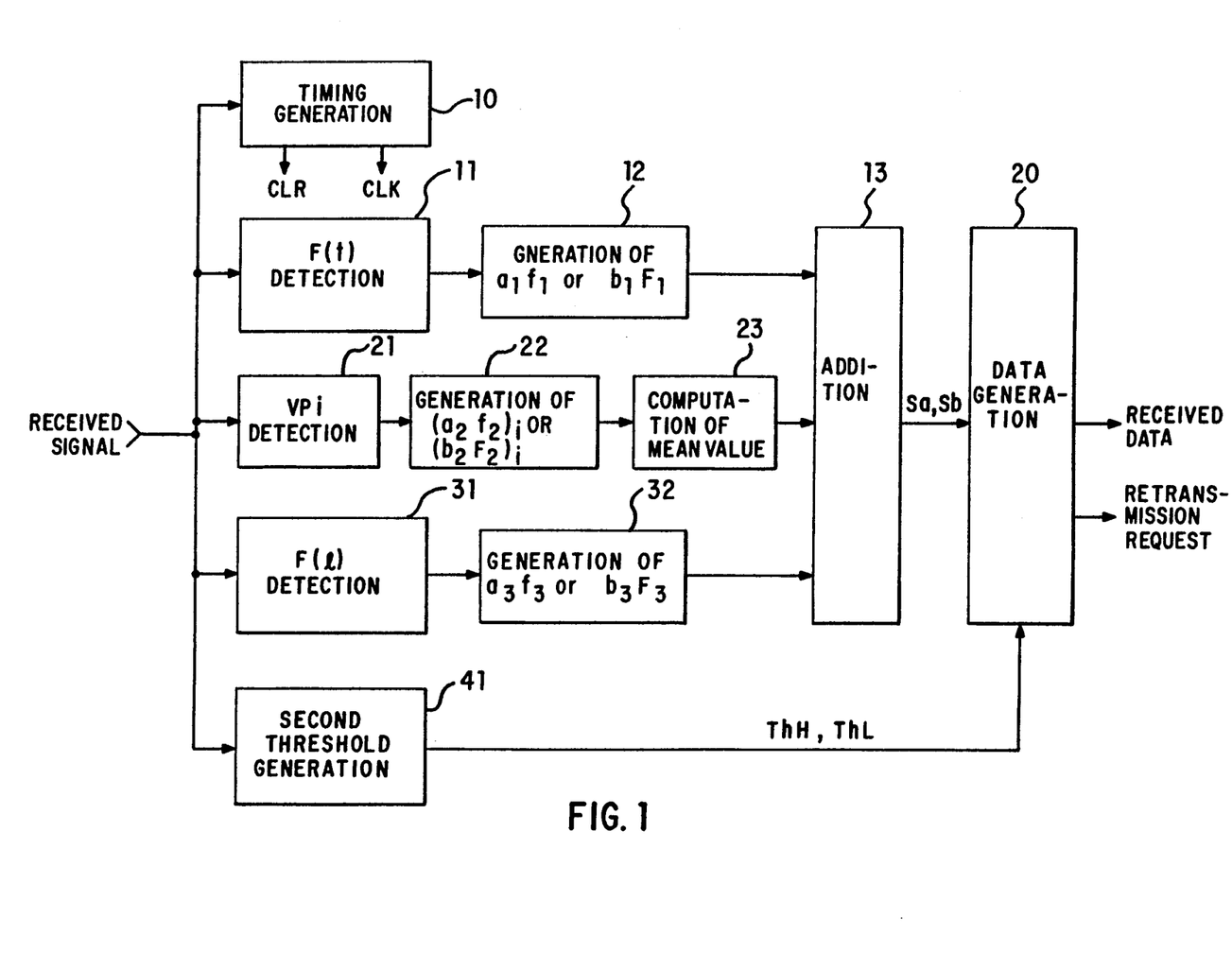
FIG. 1 is a functional block diagram illustratively showing a waveform shaping apparatus in an embodiment according to the present invention.
Figure 2:
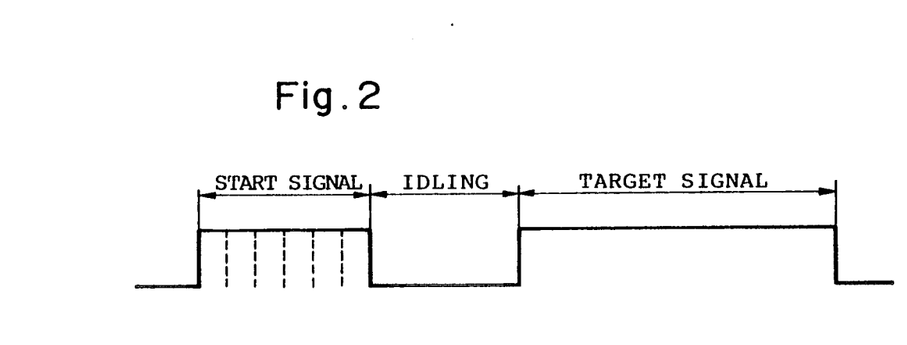
FIG. 2 is a schematic diagram showing a format of a received signal of the apparatus of FIG. 1.

FIG. 1 is a functional block diagram schematically showing an embodiment employed in a communication system according to the present invention in which a waveform shaping apparatus of the present invention is applied to a waveform shaping of a signal received by the communication system. Each block of this configuration may be formed with hardware elements or may be implemented by use of a computer software system. Moreover, the block may include a portion materialized with a hardware component and a remaining portion realized with a software element. In many cases, a computer system achieves functions of a plurality of such blocks. FIG. 2 shows an example of a signal format of the received signal; whereas FIG. 3 shows an example of a waveform of the received signal.

Figure 3:
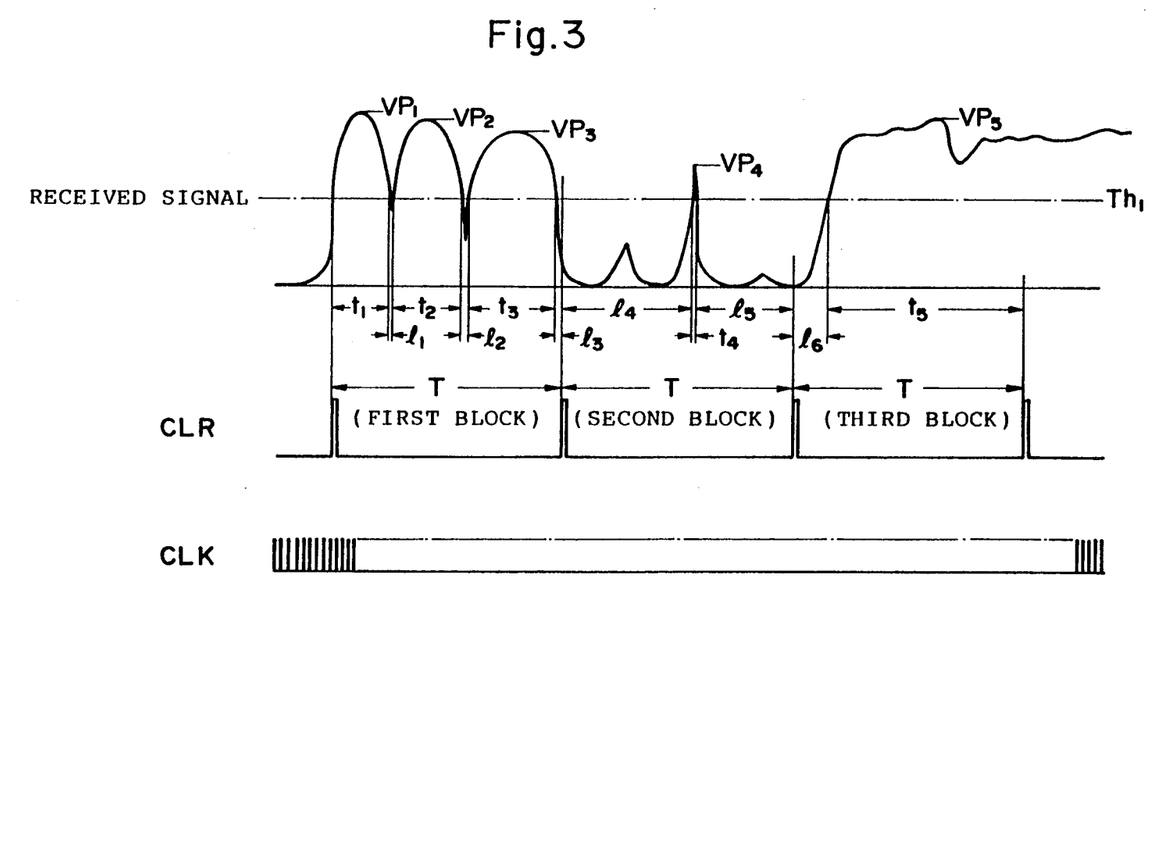
FIG. 3 is a waveform diagram showing waveforms respectively of a received signal, a clear signal, and a clock signal.

Referring to FIGS. 2 and 3, the operation of the configuration shown in FIG. 1 will be described. A timing generator section 10 detects a start signal (start bit) contained in the received signal and then generates after a preset idling period of time a clear signal CLR having a fixed period T and a clock signal CLK having a frequency considerably higher than a frequency of the clear signal CLR. These signals i.e. the clear signal CLR and the clock signal CLK are thereafter supplied to other constituent blocks. The period T of the clear signal CLR is associated with a block of the received data, and the length of the period T is determined depending on a communication speed adopted in the communication system. The block is, for example, of a length of a one-bit data. In this embodiment, for each block (period T), the received signal is subjected to a waveform shaping so as to produce a signal (received data) representing a value "1" or "0".

Referring particularly to FIG. 3, a description will be given of a level discrimination conducted on the received signal based on an appropriate threshold value $Th_1$. Let us assume that a time width where the signal value exceeds the threshold value $Th_1$ is denoted as a signal time width t (indicated as $t_1$, $t_2$, $t_3$, etc. in FIG. 3)

and that a time width where the signal value is therebelow is designated as a signal failure time width l ($l_1$, $l_2$, and so on). Moreover, in each time width, a peak value not less than the threshold value $Th_1$ is denoted as a peak value level VP ($VP_1$, $VP_2$, $VP_3$, and so on).

Figure 4A:
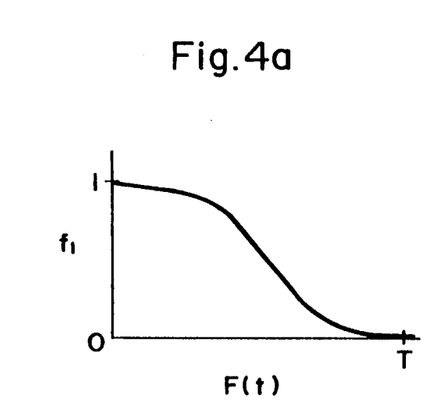
FIGS. 4a to 4c are graphs showing examples of functions representing likelihood of a value "0"
Figure 4B:
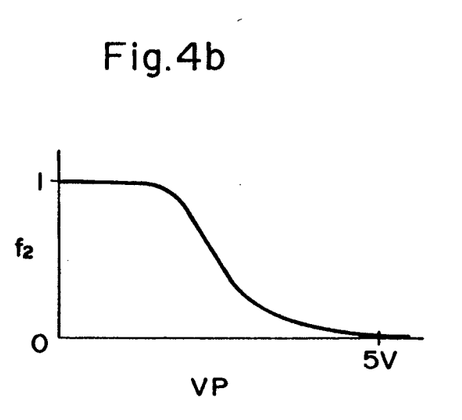
Figure 4C:
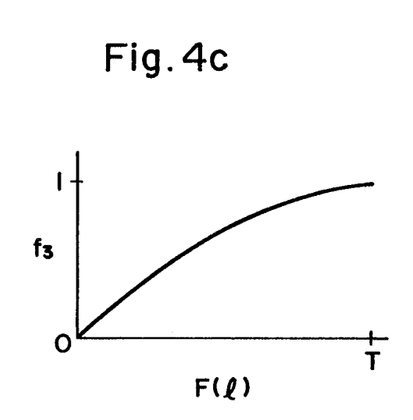

The attributes t, l, and VP of the received signal develop characteristics shown in FIGS. 4a to 4c and FIGS. 5a to 5c. FIGS. 4a to 4c respectively show graphs of functions $f_1$, $f_2$, and $f_3$ representing likelihood of "0" for the attributes t, l, and VP, respectively. In addition, FIGS. 5a to 5c respectively show graphs of functions $F_1$, $F_2$, and $F_3$ representing likelihood of "1" for the attributes t, l, and VP, respectively. Each of these functions $f_1$ to $f_3$ and $F_1$ to $F_3$ takes a value (grade) ranging from 0 to 1.

Figure 5A:
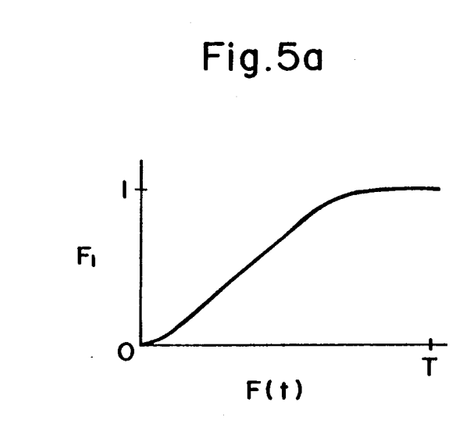
FIGS. 5a to 5c are graphs showing examples of functions representing likelihood of a value "1"

In the graphs of FIGS. 4a and 5a, the smaller the signal time width t is, the higher is the possibility of judgement of "0" for the received signal. Conversely, the greater the signal time width is, the higher is the possibility that the received signal is judged to take a value "1". In these graphs, the abscissa F(t) stands for a total of values of the signal time width t appearing in a block (period T). That is $$F(t) = \sum_n t_i \quad (1)$$

where, n indicates the number of signal time widths found in a block.

For example, in the graph of FIG. 3, $F(t)=t_1+t_2+t_3$ for the first block, $F(t)=t_4$ for the second block, and $F(t)=t_5$ for the third block. The maximum value of F(t) is equal to the period T.

Figure 5B:
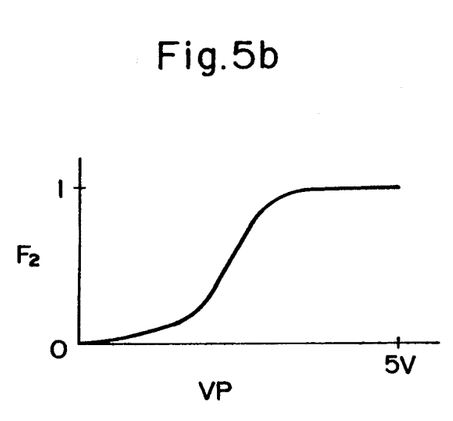

In FIGS. 4b and 5b, the lower is the peak value level VP, the higher is the possibility of judgement of "0" for the received signal. In contrast thereto, the higher the peak value level Vp, the smaller is the possibility of judgement of "1" for the received value. In the graphs of FIGS. 4b and 5b, the maximum value of the peak value level is set to 5 volts (V).

Figure 5C:
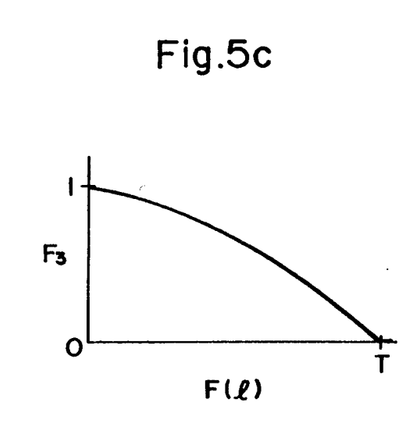

According to the graphs shown in FIGS. 4c and 5c, when the signal failure time width l becomes longer, the possibility of judgement that the received signal takes a value, "0" is increased. On the other hand, the shorter is the signal failure time width l, the higher is the possibility of judgement of "1" for the received signal. In FIGS. 4c and 5c, the abscissa F(l) denotes a total of values of the signal failure time width l appearing in a block (period T). That is $$F(l) = \sum_n l_i \quad (2)$$

where, n designates the number of signal failure time widths found in a block.

For example, in the graph of FIG. 3, $F(l)=l_1+l_2+l_3$ for the first block, $F(l)=l_4+l_5$ for the second block, and $F(l)=l_6$ for the third block.

For determining likelihood of "0" and "1" of the received signal for a block through a comprehensive judgement, let us define functions $S_a$ and $S_b$ as follows.

$$S_a = a_1 f_1 + (1/n) \sum_n (a_2 f_2)_i + a_3 f_3 \quad (3)$$

$$S_b = b_1 F_1 + (1/n) \sum_n (b_2 F_2)_i + b_3 F_3 \quad (4)$$

where, n indicates the number of peaks developed in a block and $a_1$, $a_2$, $a_3$, $b_1$, $b_2$, and $b_3$ denote coefficients related to weights.

The function $S_a$ or $S_b$ is obtained for each block such that the attained function is subjected to a level discrimination by an appropriate threshold value so as to determine a value "1" or "0" for each block.

In the embodiment above two kinds of threshold values i.e. high and low threshold values ThH and ThL are established for the level discrimination of the functions $S_a$ or $S_b$. If the value of $S_a$ is not less than ThH, the received data is assumed to be "0"; whereas, if the value is not more than ThL, the data is regarded as "1". Alternatively, if the value of $S_b$ is not less than ThH, data is judged to be "1"; whereas, if the value is not more than ThL, the data is regarded as "0". When the value of $S_a$ or $S_b$ is between ThH and ThL, the value of received data cannot be decided. In consequence, a retransmission request is sent to the data transmission side.

In the description above, for simplicity of explanation, only one threshold value $Th_1$ is commonly adopted to obtain the signal time width t, the peak value level VP, and the signal failure time width l. However, it is favorable to set a plurality of different threshold values respectively suitable for these items t, VP, and l.

In the constitution of FIG. 1, the received signal is supplied to an F(t) detector unit 11, a $VP_i$ detector unit 21, an F(l) detector unit, and a second threshold generator unit 41. The F(t) detector 11 detects a function value F(t) for each block (period T) and then supplies the value to a subsequent unit 12, which in turn generates values of $a_1 f_1$ or $b_1 F_1$ from the value F(t). The generator unit 12 is beforehand loaded with a function $f_1$ or $F_1$ respectively shown in FIG. 4a or 5a to accomplish the following function. Namely, this unit 12 produces the value $f_1$ or $F_1$ depending on the received value F(t) and then multiplies the attained value by the coefficient $a_1$ or $b_1$.

The $VP_i$ detector 21 includes e.g. a peak hold circuit, which is reset each time the received signal exceeds the threshold $Th_1$ or for each clear signal CLR, thereby supplying a previous peak value $VP_i$ kept therein to a next signal generator unit 22 producing signals $(a_2 f_2)_i$ and $(b_2 F_2)_i$. The generator unit 22 is also loaded with a function $f_2$ or $F_2$ respectively shown in FIG. 4b or 5b. Namely, each time a detected peak value is received, the unit 22 creates a function value $f_2$ or $F_2$ and then multiplies the resultant value by the coefficient $a_2$ or $b_2$ to send the obtained value to a mean value computing circuit 23. This computing circuit 23 is reset for each clear signal CLR such that the input value $(a_2 f_2)_i$ or $(b_2 F_2)_i$ received during the period T are added to each other and then the attained total is divided by the number of received values so as to compute a mean value thereof.

The F(l) detector 31 is disposed to detect a value F(l) for each block (period T) to supply the detected value to a signal generator unit 32, which then produces therefrom signals $a_3 f_3$ or $b_3 F_3$. This generator unit 32 is beforehand loaded with a function $f_3$ or $F_3$ to achieve the following function. That is, a value $f_3$ or $F_3$ is created depending on a received value f(l) and then the obtained value is multiplied by the coefficient $a_3$ or $b_3$.

The value $a_1f_1$ or $b_1f_1$ generated by the generator unit 12, the value $$(1/n) \sum_n (a_2f_2)_i \text{ or } (1/n) \sum_n (b_2f_2)_i$$

computed by the mean value computing unit 23, and the value $a_3f_3$ or $b_3F_3$ produced by the signal generating unit 32 are supplied to the adder unit 13. Resultantly, the received values are added to each other according to the expression (3) or (4) to obtain the comprehensive function $S_a$ or $S_b$. The function $S_a$ or $S_b$ is then fed to the data generating unit 20.

On the other hand, the second threshold generator 41 processes the received signal to detect an amplitude of the white noise and a peak value of the noise in a form of a pulse. Using the detected values, a predetermined fuzzy inference or reasoning is accomplished to create the high and low threshold values ThH and ThL to be delivered to the data generator 20. The received threshold values ThH and ThL are compared with the comprehensive functions $S_a$ or $S_b$ to produce an output i.e. the data of "1" or "0". When the value of the function $S_a$ or $S_b$ is detected to be between the threshold values ThH and ThL, a retransmission request signal is outputted to the transmission side. It is natural that the data generating unit 20 may discriminate the functions $S_a$ or $S_b$ based on fixed threshold values other than the threshold values ThH and ThL.

Figure 6:
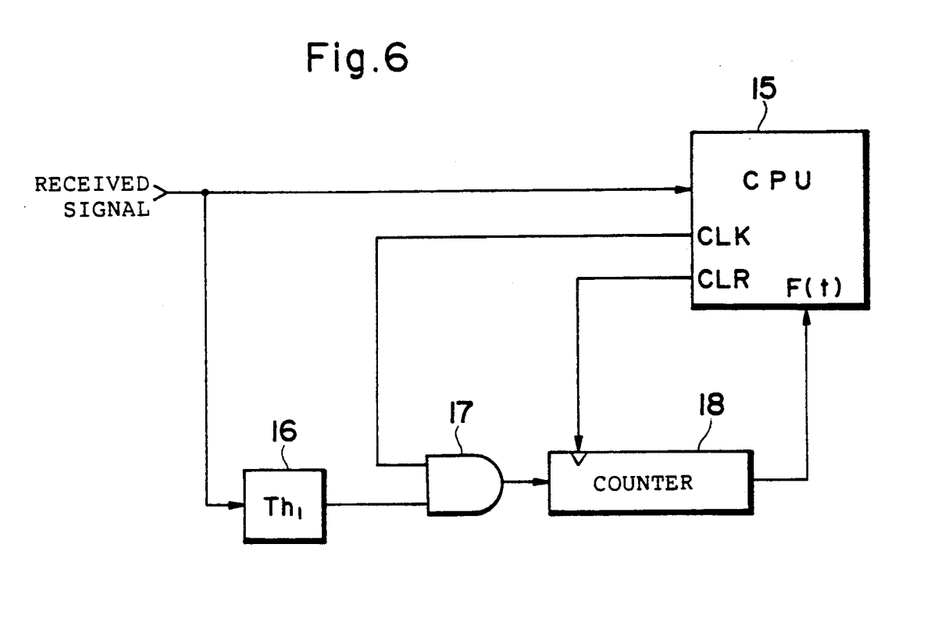
FIG. 6 is a block diagram schematically showing a configuration example of an F(t) detecting section of FIG. 1.

FIG. 6 illustratively shows an example of the constitution of the timing generator unit 10 and the F(t) detector unit 11.

A signal supplied to this configuration is passed to a central processing unit (CPU) 15 via an appropriate interface. On detecting a start signal (start bit), the CPU 15 produces a clear signal CLR having a fixed period T and a high-frequency clock signal CLK. On the other hand, the received signal is sent to a level discriminating circuit 16, which in turn achieves a level discrimination on the received signal based on a first threshold $Th_1$. If the received signal has a signal level exceeding the threshold $Th_1$, the level discriminator 16 outputs a signal at a high level H to an AND gate 17. In this situation, namely, when the level discrimination circuit 16 creates an H-level output signal, the AND gate 17 kept supplied with the clock signal CLK from the CPU 15 delivers the clock signal CLK to a counter 18. The counter 18 is reset on receiving a clear signal CLR to start a counting operation of the inputted clock signals CLKs. When a clear signal CLR is again fed to the counter 18 after a period T is elapsed therefrom, the counter 18 outputs the count value at the point of time to the CPU 15 and then re-initiates the counting operation of the clock signals CLKs inputted thereto. The CPU 15 transforms the count value received from the counter 18 into the function value F(t).

The F(l) detecting unit 31 may also be configured in almost the same manner as described above. That is, the signal produced from the level discriminating circuit 16 need only be inverted between the levels and L to be delivered to the AND gate 17. If necessary, the level discriminator 16 may be assigned with a threshold value different from the threshold $Th_1$.

Next, a description will be given of a configuration example of the second threshold generating unit 41.

Figure 7:
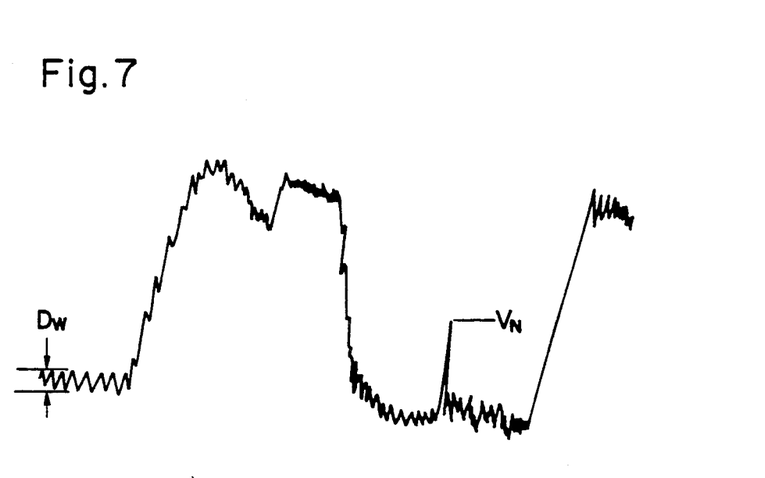
FIG. 7 is a waveform diagram showing a waveform of a received signal in which noises are emphasized.

FIG. 7 shows an example of the waveform of an input signal received by the unit. As can be seen from this graph, the received signal contains a white noise and a pulsated noise. The second threshold generator 41 detects a so-called mean value of an amplitude $D_W$ of the white noise and a peak value $V_N$ of the pulsated noise and then conducts a fuzzy inference based thereon to determine the high and low threshold values ThH and ThL.

Figure 8:
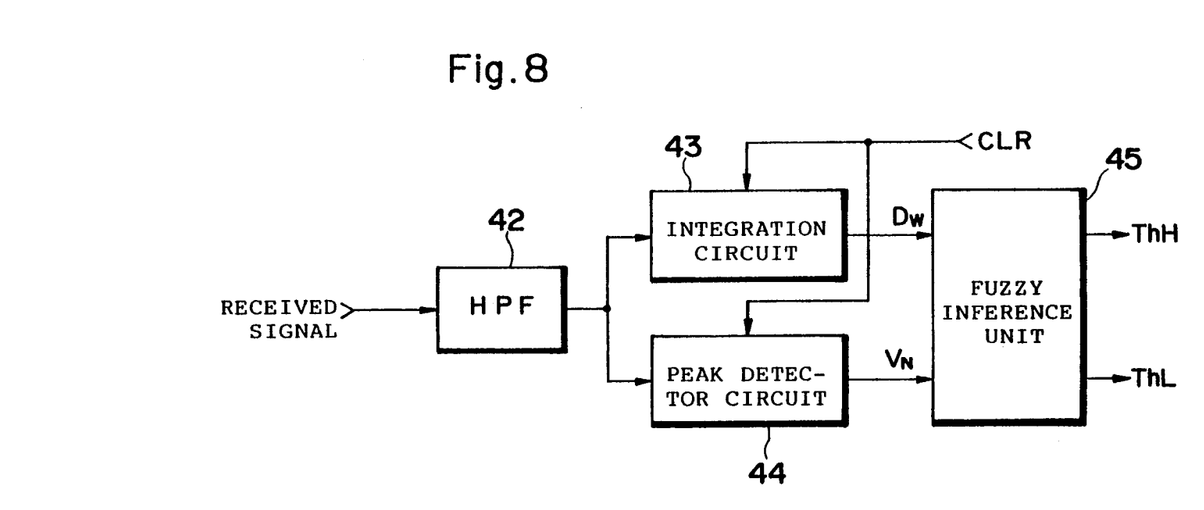
FIG. 8 is a block diagram schematically showing a configuration example of a second threshold generator unit for generating a second threshold.

FIG. 8 shows an example of the constitution of the second threshold generating unit 41.

In this circuit configuration, a signal received therein is delivered to a high-pass filter 42, which then eliminates the inherent signal component to pass therethrough only a high-frequency noise component, which is inputted to an integration circuit 43 and a peak detector circuit 44. The integrator circuit 43 and the peak detector 44 are kept supplied with a clear signal CLR, that is, these circuits are cleared at an interval of the period T to repeatedly accomplish the respective operations.

Figure 9:
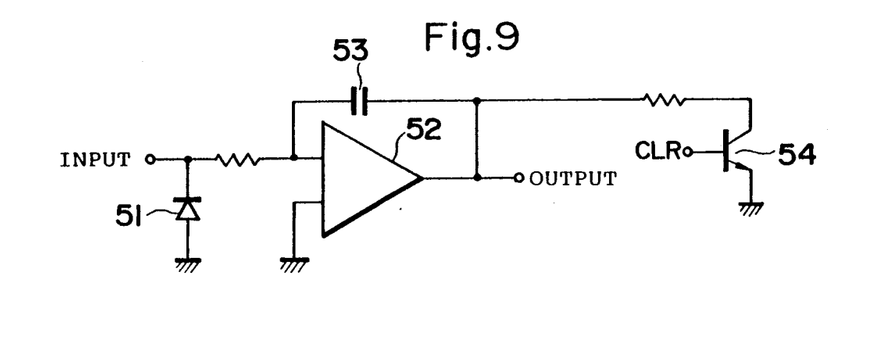
FIG. 9 is a diagram illustratively showing a circuit example of an integration circuit of FIG. 8.

As shown in FIG. 9, the integrating circuit 43 includes a diode 51 disposed to extract from the inputted high-frequency noise signal only a component having either one of the polarities, an operational amplifier 52 having a capacitor 53 in a feedback loop thereof for integrating the extracted noise signal of the polarity, and a transistor 54 to be turned on by the clear signal CLR so as to discharge the capacitor 53 at an interval of the period T. The integration circuit 43 produces a value resultant from the integration and then delivers the integration value as the white noise amplitude $D_W$ to the fuzzy inference unit 45.

Figure 10:
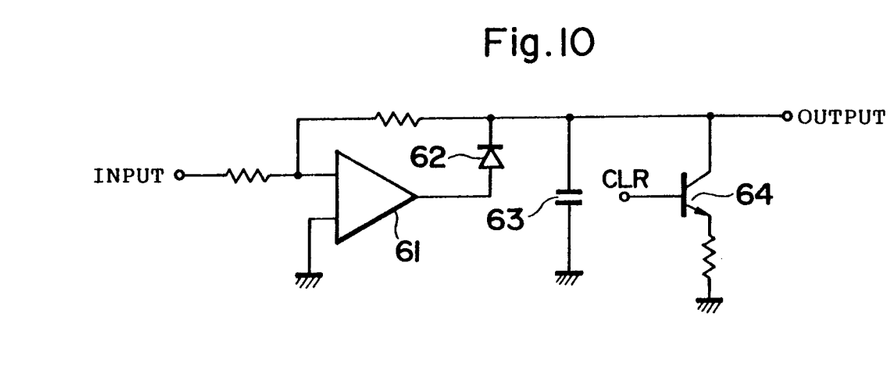
FIG. 10 is a circuit diagram showing an example of a peak detection circuit of FIG. 8.

The peak detecting circuit 44 comprises an operational amplifier 61 and a diode 62 forming a circuit element which extracts from the received noise signal a component having a predetermined polarity to amplify the extracted component. The configuration of the circuit 44 further includes a capacitor 63 keeping a peak level of an output from the operational amplifier 61 and a transistor 64 to be turned on by the clear signal CLR to discharge electric charges from the capacitor 63. The peak detector 44 outputs a detected peak value $V_N$ to the fuzzy inference unit 45.

The fuzzy inference unit 45 receives the integration value $D_W$ from the integration circuit 43 and the peak value $V_N$ from the peak detector circuit 44, the values being developed immediately before an output of the clear signal CLR. The fuzzy inference unit 45 may be implemented by any architechture of a digital system or an analog system dedicated to the inference operation. Alternatively, the fuzzy reasoning unit 45 may be materialized by providing a microcomputer with a fuzzy inference program.

Figure 11:
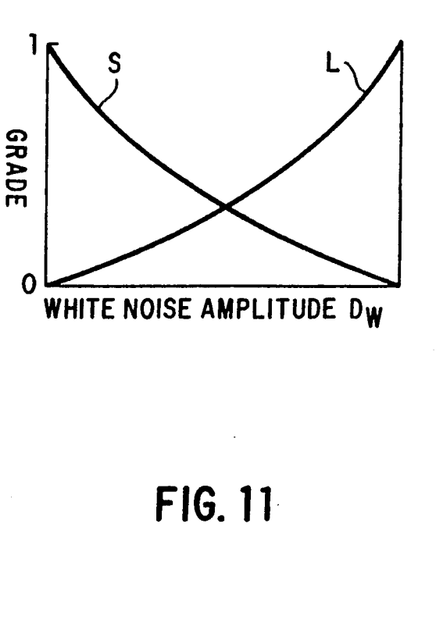
FIG. 11 is a graph showing membership functions of a white noise amplitude.
Figure 12:
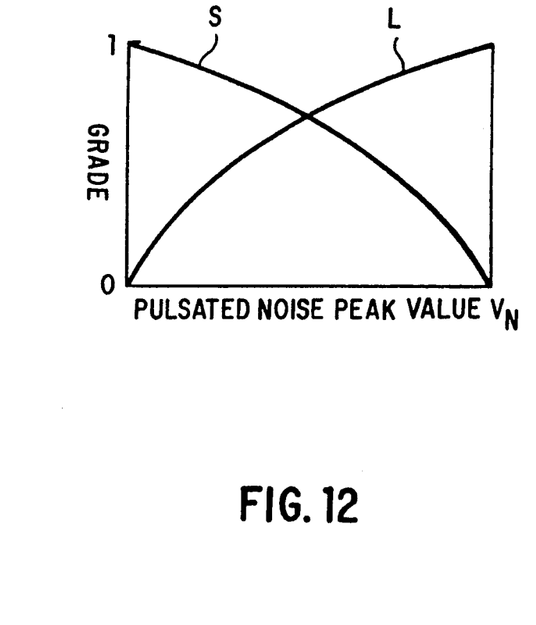
FIG. 12 is a graph showing membership functions of peak value of a pulsated noise.
Figure 13:
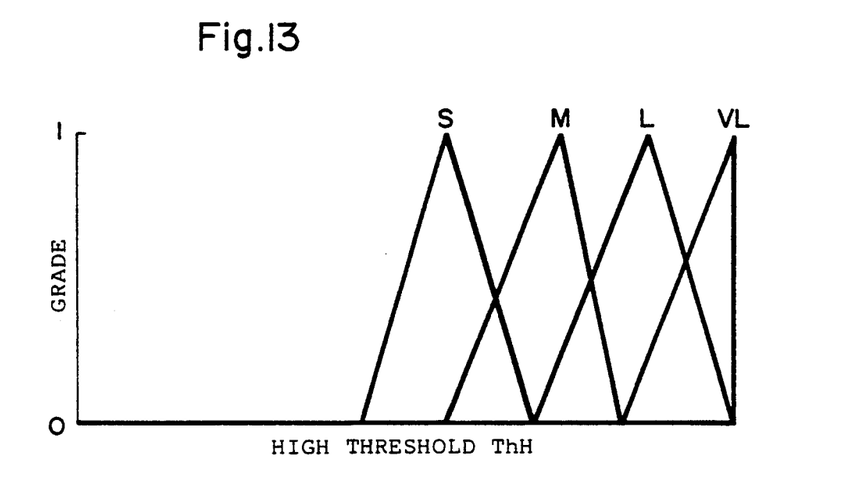
FIGS. 13 and 14 are graphs respectively showing membership functions of high and low threshold values, respectively.
Figure 14:
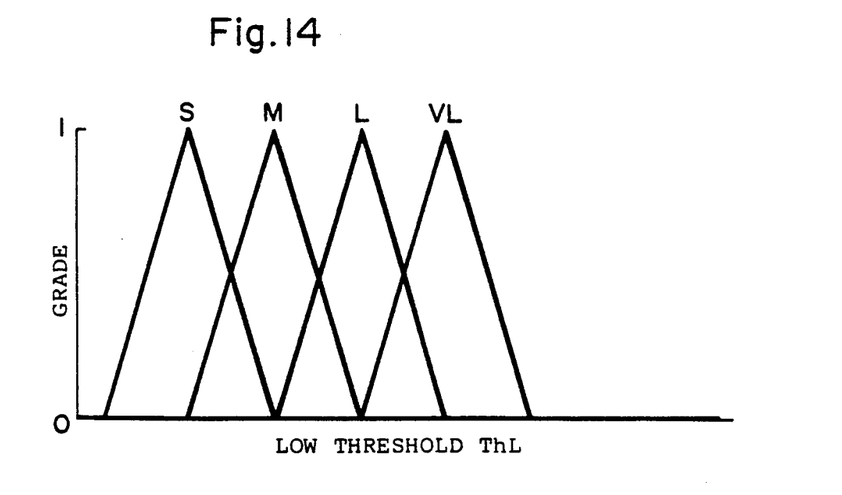

The fuzzy inference unit 45 is beforehand loaded with membership functions respectively of the input variables i.e. the white noise amplitude $D_W$ and the peak value $V_N$ of the pulsated noise as shown in FIGS. 11 and 12 and with those of the output variables i.e. the high and low threshold values ThH and ThL as shown in FIGS. 13 and 14.

In this embodiment, two kinds of membership functions respectively expressing linguistic information associated with "large (L)" and "small (S)" are established for each of the noise amplitude $D_W$ and the peak value $V_N$. Moreover, four types of membership functions respectively representing linguistic information of "small (S)", "middle (M)", "large (L)", and "very large (VL)" are set for each of the high and low threshold values ThH and ThL.

Figure 15:
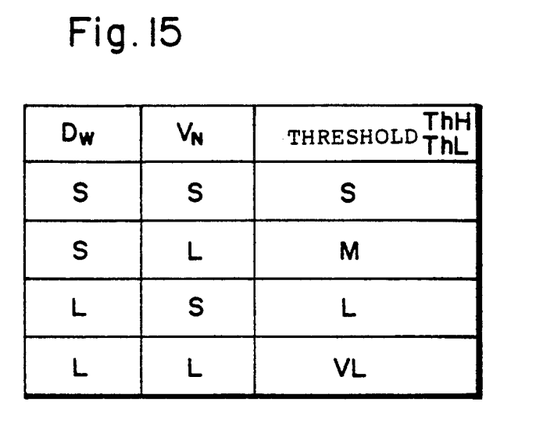
FIG. 15 is a table showing fuzzy inference rules.

Furthermore, the fuzzy reasoning unit 45 is in advance loaded with rules, namely, so-called "if, then" rules as listed in the format of a table in FIG. 15. The upper-most row of this table contains entry items expressing the following rule.

If the noise amplitude $D_W$ is small (S) and the noise peak value $V_N$ is small (S), then decrease (lower; S) the high and low threshold values ThH or ThL.

The fuzzy inference unit 45 conducts a fuzzy inference according to the membership functions and the rules based on the noise amplitude $D_W$ and the noise peak value $V_N$ received for each period T and then defuzzifies the inference result to finally decide the threshold ThH or ThL.

The threshold ThH or ThL thus obtained reflects the state of the noise and hence is suitable for a level discrimination to be achieved on a signal including a noise component. Consequently, the threshold ThH or ThL may be adopted to achieve the level discrimination not only for the comprehensive function $S_a$ or $S_b$ but also for any signals generally used. In the embodiment above, two kinds of threshold values, namely, the high and low threshold values are computed; however, the system may be configured to obtain only one kind of threshold value.

Figure 16:
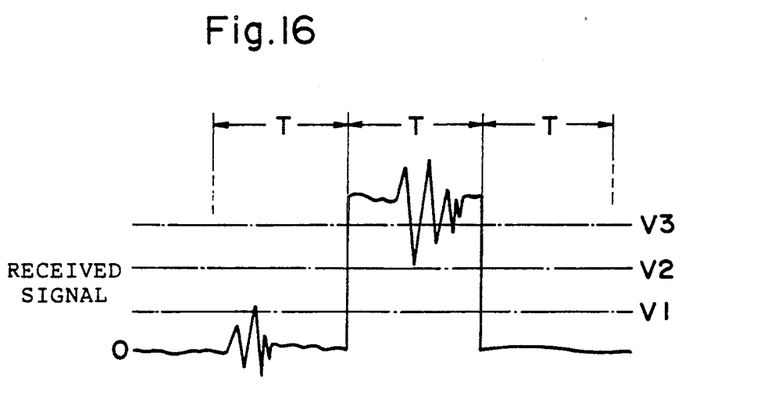
FIG. 16 shows a waveform diagram representing relationships between a received signal as an input and a plurality of threshold values and FIG. 17 shows a block diagram representing a configuration example of a waveform shaping circuit.
Figure 17:
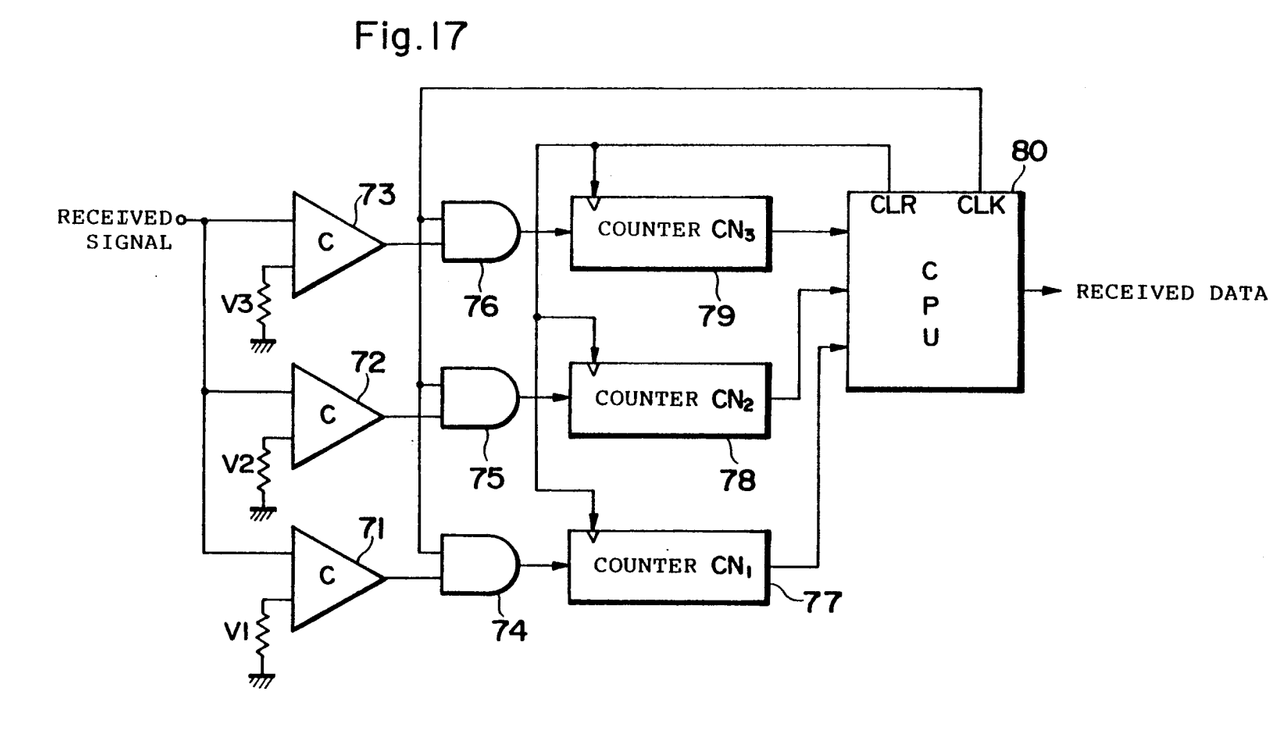

FIGS. 16 and 17 show an alternative embodiment according to the present invention.

As shown in FIG. 16, in a range where the value of the received signal varies, a plurality of (three in this embodiment) different threshold values V1, V2, and V3 (V3 > V2 > V1) are established. For each period T of the received signal, the circuit system of FIG. 17 measures a total $CN_1$ of time widths of signals exceeding the threshold value V1, a total $CN_2$ of time widths of signals exceeding the threshold value V2, and a total $CN_3$ of time widths of signals exceeding the threshold value V3. Thereafter, a comprehensive function S is computed as follows.

$$S_c = c_1 CN_1 + c_2 CN_2 + c_3 CN_3 \quad (5)$$

where, $c_1$, $c_2$, and $c_3$ are coefficients. The function $S_c$ is then discriminated by an appropriate threshold value (which may be a fixed value or the threshold value ThH or ThL), thereby determining a data value "1" or "0" for the received signal.

FIG. 17 shows an example of the configuration of the circuit accomplishing the operation above.

The received signal is fed to three comparators 71, 72, and 73, which are respectively loaded with threshold values V1, V2, and V3 in advance. When the input signal received by the system exceeds any one of the threshold values, the associated comparator produces an H-level signal. Concretely, the H-level signals are supplied from the comparators 71, 72, and 73 to related AND gates 74, 75, and 76, respectively. The AND gates 74 to 76 are kept supplied with a clock signal CLK such that when the outputs from the related comparators 71 to 73 are at a level H, the clock signal CLK is passed therethrough to associated counters 77, 78, and 79. Each of the counters 77 to 79 is cleared by a clear signal CLR to initiate counting the clock signals CLKs supplied thereto. Thereafter, immediately before the counters 77 to 79 are cleared again, count values thus obtained by the counters 77 to 79 are respectively fed as the totals $CN_1$, $CN_2$, and $CN_3$ to a CPU 80. The CPU 80 conducts a computation of the expression (5) for each period T so as to compare the result of the computation with a predetermined threshold value, thereby producing a value of received data. In a case where the value "1" or "0" cannot be determined, the system may outputs a retransmission request to the transmission side.

The description has been given of the embodiment above in association with a waveform shaping of received data; however, it is to be understood that the present invention is also applicable to arbitrary signals.

While the present invention has been described with reference to the particular illustrative embodiments, it is not to be restricted by those embodiments but only by the appended claims. It is to be appreciated that those skilled in the art can change or modify the embodiments without departing from the scope and spirit of the present invention.

What is claimed is:

1. A waveform shaping method comprising the following steps of:
   detecting at least two items selected from three items including a signal time width, a peak value level, and a signal failure time width of an input signal in a unit time length;
   converting for each of the detected items a detected value into a function value based on a function representing likelihood of a logical value "1" or "0";
   conducting a predetermined computation on the converted function values related to the at least two items to attain a result; and
   discriminating the result of the computation by a predetermined threshold value, thereby determining a logical value "1" or "0" for the input signal in the unit time length.

2. A waveform shaping method according to claim 1 further including the steps of:
   detecting a value representing an amplitude of a white noise contained in the input signal and a peak value of a pulsated noise contained therein; and
   receiving the detected values as inputs thereto to execute processing based on:
   (1) membership functions respectively associated with: (a) the value representing the amplitude of the white noise, (b) the peak value of the pulsated noise and (c) threshold values, and
   (2) predetermined rules,
   to thereby produce the threshold value.

3. A method of generating first and second threshold values for discriminating an input signal to determine if the input signal is logical "1" or logical "0" or if the input signal is "undeterminable" comprising the steps of:
   detecting a value representing an amplitude of a white noise contained in the input signal;
   detecting a value representing a peak value of a pulsated noise contained in the input signal; and
   receiving the detected values are inputs thereto to conduct fuzzy processing based on:
   (1) membership functions respectively associated with: (a) the value representing the amplitude of the white noise, (b) the peak value of the pulsated noise and (c) first and second threshold values, and
   (2) in accordance with predetermined rules,
   to determine the first and second threshold values.

4. A waveform shaping apparatus comprising:
   means for detecting at least two items selected from three items including a signal time width, a peak value level, and a signal failure time width of an input signal in a unit time length;

means for converting for each of the detected items a detected value into a function value based on a function representing likelihood of a logical value "1" or "0";

means for conducting a predetermined computation on the converted function values related to the at least two items to attain a result;

means for discriminating the result of the computation by a predetermined threshold value thereby determining a logical value "1" or "0" for the input signal in the unit time length.

5. A waveform shaping apparatus according to claim 4 further including:

means for detecting a value representing an amplitude of a white noise contained in the input signal;

means for detecting a peak value of a pulsated noise contained therein; and means for receiving the detected values as inputs thereto to execute processing based on:

(1) membership functions respectively associated with: (a) the value representing the amplitude of the white noise, (b) the peak value of the pulsated noise and (c) threshold values, and (2) predetermined rules, to thereby produce the threshold value.

6. An apparatus for generating first and second threshold values for discriminating an input signal to determine if the input signal is logical "1" or logical "0" or if the input signal is "undeterminable" comprising:

means for detecting a value representing an amplitude of a white noise contained in an input signal;

means for detecting a peak value of a pulsated noise contained therein; and means for receiving the detected values as inputs thereto to conduct fuzzy processing based on:

(1) membership functions respectively associated with: (a) the value representing the amplitude of the white noise, (b) the peak value of the pulsated noise and (c) first and second threshold values, and (2) in accordance with predetermined rules, thereby producing the first and second threshold values.

7. A waveform shaping method comprising the following steps of:

setting first threshold values of a plurality of different levels for an input signal to discriminate the input signal respectively by the first threshold values for a predetermined period of time, thereby obtaining time widths respectively of portions of the input signal exceeding the respective threshold values;

achieving a predetermined computation on attained plural time widths; and discriminating results of the computation by a second threshold value to determine a logical value "1" or "0" for the input signal in the predetermined period of time.

8. A waveform shaping apparatus comprising:

comparing means to be loaded with first threshold values of a plurality of different levels for an input signal for discriminating the input signal respectively by the first threshold values for a predetermined period of time, thereby obtaining time widths respectively of portions of the input signal exceeding the respective threshold values;

means for executing a predetermined computation on the attained plural time widths; and means for discriminating results of the computation by a second threshold value to determine a logical value "1" or "0" for the input signal in the predetermined period of time.

* * * * *